United States Patent [19]
Weigand et al.

[11] Patent Number: 5,567,059
[45] Date of Patent: Oct. 22, 1996

[54] WINDOW CAGE

[75] Inventors: Michael Weigand, Elfershausen; Werner Ganss, Schweinfurt; Martin Grehn, Dittelbrunn, all of Germany

[73] Assignee: FAG Kugelfischer Georg Schafer AG, Germany

[21] Appl. No.: 449,420

[22] Filed: May 24, 1995

[30] Foreign Application Priority Data

Jul. 19, 1994 [DE] Germany ............................ 44 25 381.8

[51] Int. Cl.⁶ .................................................. F16C 33/46
[52] U.S. Cl. ............................ 384/560; 384/572; 384/575
[58] Field of Search .................................... 384/560, 572, 384/575, 576, 578, 579

[56] References Cited

U.S. PATENT DOCUMENTS

| | | |
|---|---|---|
| 2,711,938 | 6/1955 | Herrmann . |
| 3,644,006 | 2/1972 | Feuillat et al. ........................... 384/560 |
| 4,208,078 | 6/1980 | Miki ....................................... 384/572 |
| 5,033,878 | 7/1991 | Tsuji et al. .............................. 384/576 |
| 5,417,502 | 5/1995 | Waldert et al. ......................... 384/572 |

FOREIGN PATENT DOCUMENTS 0051083  10/1984  European Pat. Off. .

*Primary Examiner*—Lenard A. Footland
*Attorney, Agent, or Firm*—Ostrolenk, Faber, Gerb & Soffen, LLP

[57] ABSTRACT

To provide good cage guidance in a window cage for a preferable flangeless spherical roller bearing in order that the bearing might achieve higher loads, the cage includes two annular axially spaced apart ribs and transverse ribs that extend between the annular ribs and define cage pockets. At least one and preferably two and preferably opposite pockets of the cage are loading pockets. The annular ribs are radially outside the pitch circle of the bearing, but at the loading pockets, those ribs are recessed inward nearly on the pitch circle of the bearing and preferably outward thereof about the thickness of the rib material. The angle between the center of the loading pocket and the adjacent pocket is larger than the angle between the centers of other adjacent pockets to facilitate loading of the loading pockets.

15 Claims, 5 Drawing Sheets

5,567,059

WINDOW CAGE

BACKGROUND OF THE INVENTION

The present invention relates to a window cage having pockets designed for enabling full support of the bearing rollers and pockets specially adapted for insertion of rollers. The invention further concerns a method for assembling a spherical roller bearing with such a cage.

A window cage of the type for which the invention is used is known from EP PS 0 051 083. That cage is made spring elastic to enable it to be inserted into the bearing. The interior or inner bearing ring has indentations to optimize the contact and starting geometry and to improve the lubricating properties. A disadvantage of this arrangement is that retaining noses must be embossed on the ribs for reliable retention of the rollers in the pockets, thus making the cage more expensive to make and its assembly more difficult.

SUMMARY OF THE INVENTION

Objects of the present invention are to improve a window cage of this type such that it produces good cage guidance with an optimum related load for the bearing, is simple in design, and can be manufactured and assembled economically.

To provide good cage guidance in a window cage for a preferably flangeless spherical roller bearing, in order that the bearing might bear higher loads, the cage includes two annular axially separated ribs and transverse ribs that extend between the annular ribs and define cage pockets and at least one and preferably two and preferably two opposite pockets of the cage are loading pockets. The annular ribs are outside the pitch circle of the bearing, but at the loading pockets, those ribs are recessed inward nearly on the pitch circle of the bearing and preferably outward thereof about the thickness of the rib material. The angle between the center of the loading pocket and the adjacent pocket is larger than the angle between the centers of other adjacent pockets to facilitate loading of the loading pockets.

Except for the loading pockets, the pockets of the cage are located radially far outside the pitch circle. This causes large rib widths and produces a stable cage, as well as producing reliable positive roller retention.

The possible outer ring guidance of the cage using a guide flange or guide tabs, because of good lubricant supply, produces favorable frictional behavior and makes these bearings suitable for withstanding all types of stress, such as axial loads and vibrating stress.

Assembly of the bearing can be performed without using a divided outer ring, thus avoiding the disadvantages of high manufacturing cost and the problem of holding the divided outer ring together during loose bearing function under load.

The design in which the rib edge of the filling pocket is located outside the pitch circle by an amount equal to the thickness of the metal provides simple means to ensure that the roller can be snapped in place elastically and also ensures secure roller retention. If the rib edges were located further outward, the pocket opening would be too large to ensure exact roller guidance, especially upon reversing, while if the rib edges were drawn further inward, securing the rollers against falling out could only be accomplished by employing additional means.

Although a needle bearing cage disclosed in U.S. Pat. No. 2,711,938 has the centers of the cage pockets at different angular distances apart, this serves to avoid pressing (brinelling) the needles into the raceway. However, this prior art provides no suggestions regarding spherical roller bearings or about mounting the cage in the outer ring.

Other objects, features and advantages of the invention will become apparent from the following description of the invention which refers to an embodiment shown in the accompanying drawings.

DESCRIPTION OF PREFERRED EMBODIMENTS OF THE INVENTION

Figure 1:
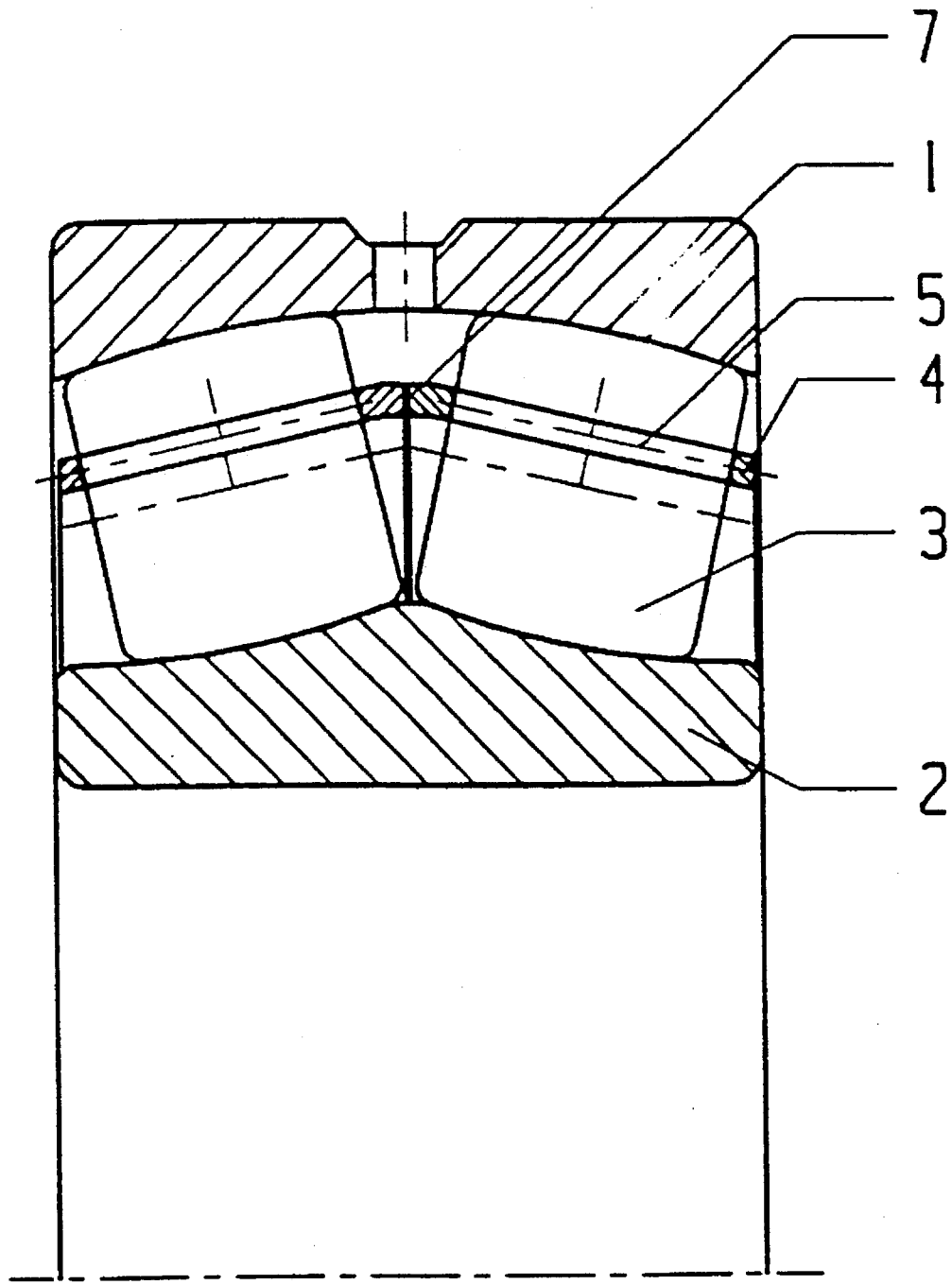
FIG. 1 shows a half portion, axial section through a double-row spherical roller bearing with a cage according to the invention.

FIG. 1 shows a spherical roller bearing including an outer ring 1 and an inner ring 2 radially inward of the outer rim. Spherical roller bearing rollers 3 are located radially between the outer and inner rings and are inserted into pockets 5 of a separator or cage 4 and to be held apart the cage.

Figure 2:
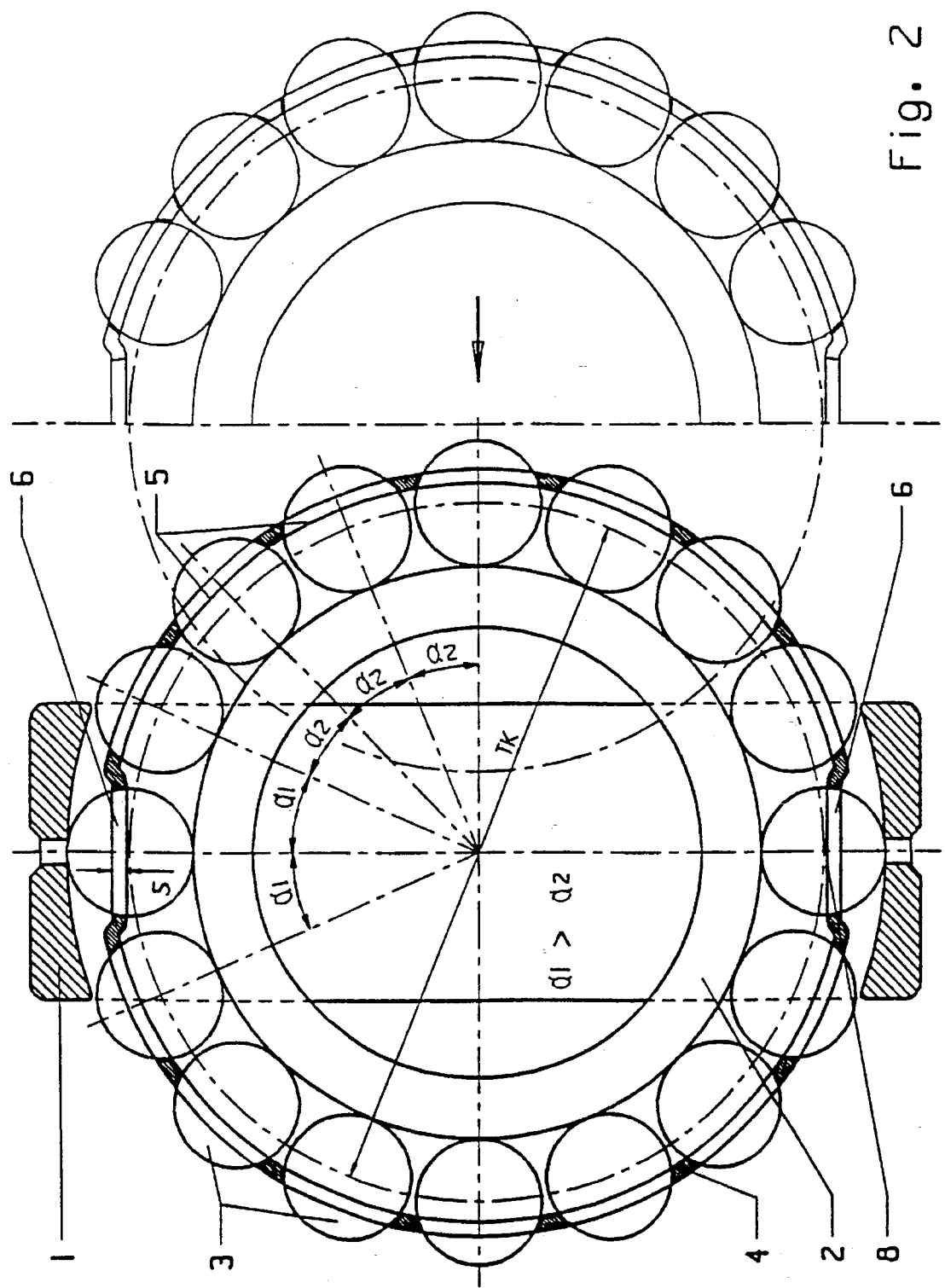
FIG. 2 shows an axial section through a spherical roller bearing outer ring with the cage swung out and rotated out of the outer ring.

As shown in FIG. 2, two opposite pockets 6 of the cage are designed as roller loading pockets 6. They are recessed radially inwardly at their cage edge areas 7 so that rib edge 8 of loading pocket 6 lies radially near on the pitch circle of radius Tk. In particular, the rib edge 8 of the loading pocket 6 is located outside the pitch circle Tk by a maximum amount equal to that thickness S of the sheet metal so that rollers 3 can be elastically snapped into guide pockets 6. Angle $\alpha 1$ between the center of the loading pocket and the center of each adjacent pocket is larger than the angle $\alpha 2$ between the remainder of the pocket centers. For example $\alpha 1$ may be about ten percent larger than $\alpha 2$. Consequently, cage 4 with its spherical roller bearing rollers inserted in the cage and being together with the inner ring can easily be placed in the outer ring 1.

Figure 3:
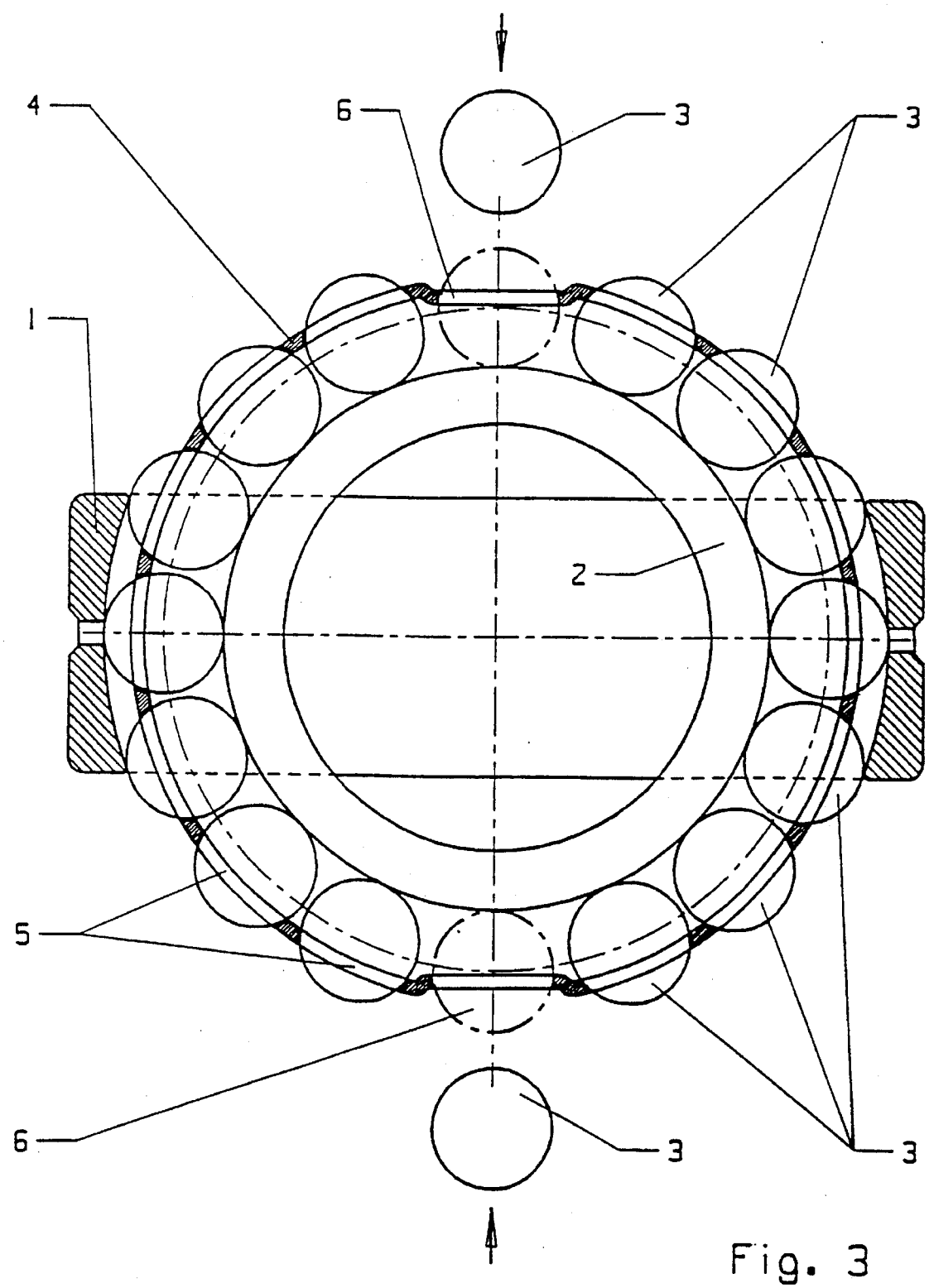
FIG. 3 shows the same axial section through a spherical roller bearing with the cage swung out and the roller ring in the position for loading the last two rollers.

FIG. 3 shows how, after insertion into the outer ring, cage 4 and rollers 3 are rotated circumferentially so that the two loading pockets 6 are exposed to be loaded from the outside with their respective rollers 3. The completed spherical roller bearing is assembled by subsequent backward pivoting of cage 4, together with the roller set and the inner ring 2, into the outer ring 1.

Figure 4:
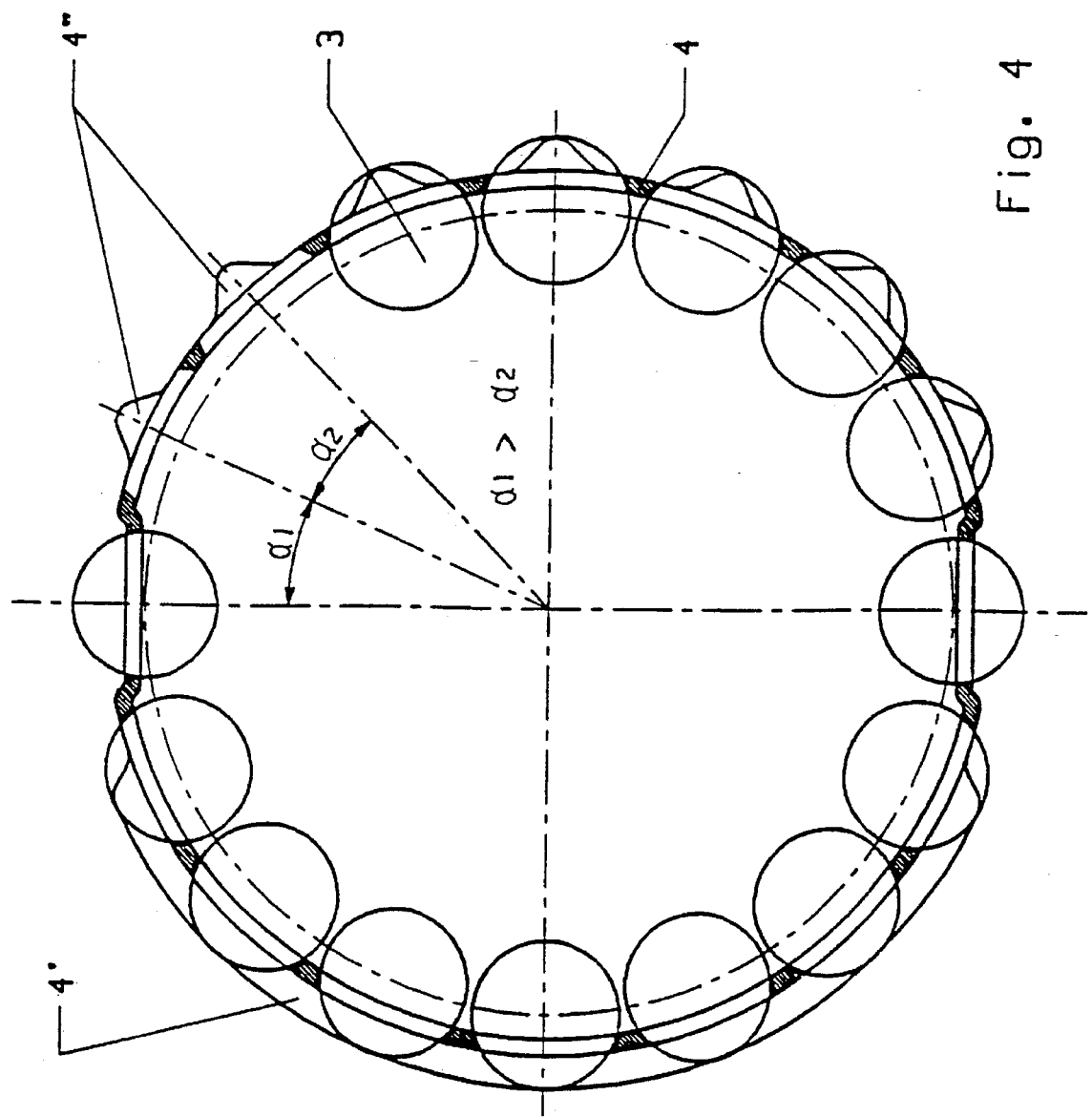
FIG. 4 shows the same section through a spherical roller bearing with the cage swung out and the roller ring with a guide flange or guide tabs.

FIG. 4 shows the cage 4 and the roller ring with either a guide flange 4' (shown in the left half of FIG. 4) or with guide tabs 4" (shown in right half of FIG. 4) that can guide the cage in the outer ring in addition to the pocket guidance on the rollers.

Figure 5:
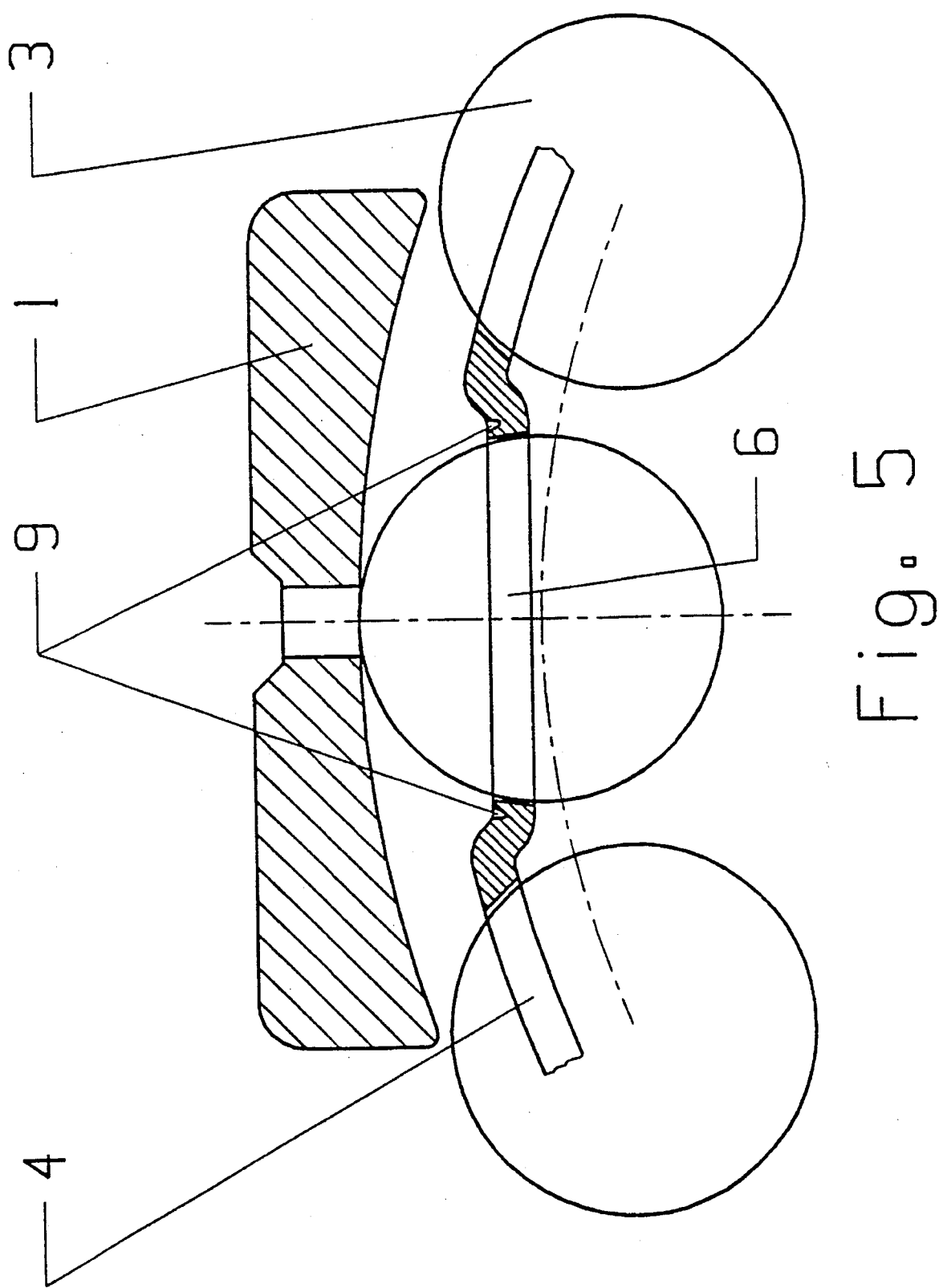
FIG. 5 shows a cutout portion of a spherical roller bearing with the cage swung out and a roller ring in which the loading pocket is provided with an additional groove that facilitates snapping the rollers in place elastically from the outside.

FIG. 5 shows a fragment of a spherical roller bearing with the cage 4 swung out and also shows the adjacent part of the roller ring, in which the ribs of loading pockets 6 are provided with an additional groove 9 that enables the cage to flex to facilitate elastic snapping in of rollers 3 from the outside.

The bearing is assembled by fitting the rollers 3 into the cage 4 and then placing the filled cage on the inner ring 2. However, the loading pockets 6 have not yet been provided with their rollers 3. Inner ring 2, cage 4, and rollers 3 are then brought into the position shown in FIG. 2 (shown at the right or drawn lightly) and are then placed into the outer ring 1.

Then cage 4 is rotated through approximately 90° from the rotative position shown in FIG. 2 with the pockets 6 inside the outer ring to the position shown in FIG. 3 with the pockets 6 outside the outer ring. Next, the two loading pockets 6 are loaded with rollers 3. The ribs may then be caulked to retain the rollers.

The ribs of loading pockets 6 can also be provided with grooves 9 that facilitate elastic snapping in of the rollers 3. Then cage 4 together with the roller set and the inner ring 2 is rotated backward so that the spherical roller bearing is assembled.

In a preferred form, the cage is manufactured as a sintered part, or as a cast part, without having been cut. Alternatively, the cage may be made from a strip of material bent into a ring.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A window cage for a spherical roller bearing, wherein the cage includes annular ribs extending around the cage and axially spaced apart and includes transverse ribs axially across the cage defining pockets in which the bearing spherical rollers may be received, wherein the annular and transverse ribs are located at a radially outward location which would be outside the pitch circle of cage with the rollers in respective cage pockets so that the ribs will positively secure the rollers in their pockets against falling outward radially;

at least one of the pockets in the cage being a loading pocket, with the annular ribs at the loading pocket being recessed inwardly with respect to the remainder of the cage so that the annular ribs at the loading pocket are located approximately on the pitch circle, whereby a roller may be loaded into the loading pocket.

2. The window cage of claim 1, wherein the transverse ribs are placed for defining successive pockets and each of the successive pockets has a center in the circumferential direction around the cage; the angle between the center of the loading pocket and the center of the adjacent pocket being greater than the angle between the centers of other adjacent ones of the pockets.

3. The window cage of claim 2, wherein there are two of the loading pockets spaced annularly apart around the cage.

4. The window cage of claim 3, wherein the loading pockets are positioned at opposite locations around the annular cage.

5. The window cage of claim 3, wherein the angle between the center of the loading pocket and the center of the adjacent pocket is about 10° larger than the angle between the centers of other ones of the adjacent pockets.

6. The window cage of claim 5, wherein the rib edges at the loading pockets are located outside the pitch circle of the cage by a maximum amount equal to the value of the thickness of the cage material at the rib for enabling the rollers to be snapped elastically into the pockets.

7. The window cage of claim 3, wherein the cage is a sintered or cast part manufactured without cutting.

8. The window cage of claim 3, wherein the cage is comprised of a strip of material bent into a ring.

9. The cage of claim 3, wherein the ribs of the cage at the loading pockets include grooves therein for facilitating elastic snapping of the rollers into place.

10. The window cage of claim 9, wherein at the loading pockets, there is a transition of the annular ribs from radially further outward to radially further inward toward the pitch circle and the grooves are in the vicinity of the transitions.

11. The window cage of claim 2 wherein the rib edges at the loading pocket are located outside the pitch circle of the cage by a maximum amount equal to the value of the thickness of the cage material at the rib for enabling the rollers to be snapped elastically into the pockets.

12. The window cage of claim 2, further comprising guide means projecting from the ribs and radially outwardly for guiding the cage on the outer ring.

13. The window cage of claim 2, further comprising a guide flange on the rib edges for guiding the cage on the outer ring.

14. The window cage of claim 2, further comprising guide tabs on the rib edges of the cage for guiding the cage on the outer ring.

15. The window cage of claim 2, wherein at the loading pockets, there is a transition of the annular ribs from radially further outward to radially further inward toward the pitch circle.

* * * * *